United States Patent

[11] 3,607,793

| [72] | Inventor | Bert H. Mahlman |
| --- | --- | --- |
| | | West Chester, Pa. |
| [21] | Appl. No. | 707,488 |
| [22] | Filed | Feb. 23, 1968 |
| [45] | Patented | Sept. 21, 1971 |
| [73] | Assignee | Hercules Incorporated |
| | | Wilmington, Del. |

[54] PROCESS FOR FORMING POROUS STRUCTURES
4 Claims, No Drawings

[52] U.S. Cl............................................................ 260/2.5 M,
117/135.5, 260/33.6 PQ, 260/93.7, 260/94.9 GD
[51] Int. Cl......................................................... C08f 3/08,
C08f 47/08, C08f 45/28
[50] Field of Search............................................ 260/2.5 M,
94.9 A, 93.7

[56] References Cited
UNITED STATES PATENTS

| 3,308,073 | 3/1967 | Kepple.......................... | 260/2.5 M |
| --- | --- | --- | --- |
| 3,380,945 | 4/1968 | Deex et al..................... | 260/94.9 A |
| 3,397,195 | 8/1968 | Lukach et al................. | 260/94.9 B |
| 3,407,151 | 10/1968 | Overcashier et al.......... | 260/2.5 E |
| 3,475,369 | 10/1969 | Blunt............................ | 260/94.9 E |

*Primary Examiner*—Murray Tillman
*Assistant Examiner*—Wilbert J. Briggs, Sr.
*Attorney*—Eleanor R. Bartholomew

ABSTRACT: An improved method is taught for preparing porous structures from olefin polymers by heating a dispersion of such polymers in a hydrocarbon liquid to a temperature above the solution temperature, cooling slowly to form a gel and extracting the hydrocarbon liquid. The improvement resides in employing, as a starting material a polymer in the form of particles no larger than about $0.5\mu$.

PROCESS FOR FORMING POROUS STRUCTURES

This invention relates to an improved process for producing porous structures of olefin polymers, and more particularly to a method of preparing such structures from high molecular weight polymers.

It is known to produce porous polymeric films by dissolving the polymer in an organic liquid at an elevated temperature, cooling the resulting solution to form a gel and the extracting the organic liquid from the gel. This process is described, e.g. in U.S. Pat. No. 3,308,073. In that reference, the polymer is heated, under vigorous agitation, to form a solution which is then poured into a film-forming mold or the like. Agitation of the solution is required in order to assure reasonable uniformity thereof while at the solution temperature prior to cooling.

The instant invention provides an improved method for forming such structures which results in greater ease of handling of the gelled material. This improvement is effected by having the olefin polymer initially present in the form of tiny, colloidal sized particles, the average primary particle size of which is in the range of 0.02 to 0.5 micron and at least 75 percent of which are in the range of 0.1 to 0.4 micron, with substantially no irreducible clusters of primary particles greater than about 5 microns in their largest dimension.

The colloidal size polymer particles employed in the practice of this invention are a relatively new development in olefin polymer technology. They can be prepared by a novel technique which involves polymerizing the desired olefin or olefins in the presence of a colloidal dispersion of a trivalent titanium-containing catalyst. This polymerization technique will be described more fully hereinbelow. However, the invention is not limited to use with particles prepared by that technique. Only the particle size is critical.

The method of the invention is applicable to a variety of crystalline olefin polymers and copolymers of the required colloidal particle size. These include propylene homopolymer and copolymers of propylene, ethylene, butene-1, 3-methyl butene-1, 3-methyl pentene-1, 4-methyl pentene-1, or styrene with up to 25 percent of a second α-olefin having 2 to 20 carbon atoms, including, inter alia ethylene propylene, butene-1, pentene-1, 3-methyl butene-1, hexene-1, 4-methyl pentene-1, 3-methyl pentene-1, heptene-1, octene-1, decene-1, dodecene-1, tetradecene-1, hexadecene-1, octadecene-1, eicosene-1, styrene, and alkyl- and halo- styrene such as p-methyl styrene and P-chloro-styrene. The preferred polymers are propylene homopolymer, block copolymers of propylene with up to 25 percent ethylene, random copolymers of propylene with up to 13 percent ethylene, and random copolymers of ethylene with about 7 to 13 percent propylene.

The improved manipulability of the process employing small particles as in this invention derives partly from the fact that small particles are more readily—i.e., more quickly—dissolved than are large particles as were known to the prior art. More importantly, however, these particles are uniformly distributed throughout the liquid medium prior to their dissolution and thus a substantially homogeneous solution is formed immediately upon dissolution without the necessity for agitation required by the prior art for forming uniform solutions. Thus, the porous structures can be formed by simply charging a mold or other shaping device with the desired quantity of the dispersion, heating to dissolve the polymer and immediately cooling. Thus results the elimination of the process step of the prior art where the hot solution is charged to the shaping means. This is a troublesome step for several reasons. For example, provision must be made for maintaining the solution at an elevated temperature during the transfer to the shaping means. Furthermore, solutions of olefin polymers, even of low molecular weight and even at low concentrations are highly viscous and do not flow into molds easily.

The ease of solution of the particles employed in the practice of this invention and the uniformity of solution without agitation lead to another significant advantage of this invention over prior art practice. Olefin polymers are usually quite sensitive to thermal degradation, particularly in the presence of air. In particular, higher molecular weight polymers almost always degraded during processing to an IV level of about 6.5. Using the process of this invention, dissolution of the particles and gel formation can be accomplished in such short times that exposure to elevated temperatures is kept to a minimum and thermal degradation is minimized. It thus becomes possible to prepare porous structures wherein the polymer intrinsic viscosity remains high, e.g. IV 9.0 and higher. Such structures could not be prepared by prior art techniques wherein the small particle olefin polymer of this invention was not employed.

The concentration of polymer particles in the diluent can vary within wide limits. Preferably, the dispersion will contain 10 to 35 percent polymer. The properties of the resultant structure such as density, porosity and tensile strength will be related, in part, to the concentration of the polymer.

The organic liquid diluent is preferably a hydrocarbon, as these exhibit the best solvency for olefin polymers at elevated temperatures. It is essential to the carrying out of this invention that the solvent be able to accomplish solution of the polymer without itself being evaporated since the resulting solution must be cooled to form an extractable gel. That is to say, cooling must take place in the presence of the liquid. In general, hydrocarbons which are liquid at above about 100° C., but which boil higher than the solution temperature of the polymer, are satisfactory. Either pure hydrocarbons such as octane, nonane, and higher homologs of this series, or mixed hydrocarbons such as are normally found in petroleum fractions such as kerosene, fuel oil, gasoline, and the like can be used. Hydrocarbon waxes, such as paraffin wax and the like, can also be used if they meet the criterion of being liquid at above ≈100° C. Aliphatic, alicyclic or aromatic hydrocarbons can be used.

Best results are obtained in practicing the invention if the polypropylene is one of relatively high molecular weight, i.e., one having intrinsic viscosity of about 10 to 12 or higher. This is not intended to preclude the application of the invention to lower viscosity polymers since these can likewise be conveniently handled and treated by this technique. However, low molecular weight polymers frequently do not yield structures of sufficiently high tensile strength to be useful when treated according to the process of this invention.

Structures of virtually any desired shape to serve many purposes can easily be prepared by the process of this invention. For example, a particularly useful application is in the preparation of porous films useful as filter media. Depending upon the porosity of the film, it is possible to prepare materials of selective permeability to liquids, which will be substantially impermeable to solids. Such porous films can also be employed as lightweight nonwoven fabrics, as synthetic "papers" or as insulating materials. More intricate shaped objects such as balls, life preservers, and various shaped toys can also be prepared by the method of this invention.

As stated, the process of the invention comprises heating the colloidal dispersion to above the solution temperature of the polymer in the organic liquid, then cooling the solution to room temperature. The rate at which this cooling takes place is critical to the formation of porosity in structures which are prepared by the process. This cooling must be accomplished at about 100° C./minute or less. The degree of porosity of the ultimate structure is inversely related to the rate at which the structure is cooled from the solution stage to a gel. Faster cooling promotes higher tensile strength.

The effect of the cooling rate on the properties of the structures is believed to be related to the ability of the polymer to form into a crystal structure. The more rapid cooling causes a rapid solidification of the polymer into a fixed form consisting of a large number of very small interconnected crystallites. There is, accordingly, substantial contact between neighboring crystallites leading to high tensile strength and low porosity. The number of interconnections increases with molecular weight. When the solution is cooled slowly, or annealed, there is ample time for the polymer to agglomerate or associate into relatively large spherulitic crystals. These are in substantially less contact with one another than is the case with the smaller crystallites formed by rapid quenching. Upon removal of the solvent or diluent, a more porous material results.

Since the process of the invention, by the nature of the crystallization which takes place, inherently forms a material of relatively low tensile strength, the use of high molecular weight polymer becomes highly desirable. The longer molecules of the high molecular weight materials more readily become entangled to develop higher tensile strength structures while retaining porosity. That is to say, there is the possibility for more of these long chains to be divided among more than one spherulite and thereby add to the tensile strength of the structure without significantly reducing the porosity.

Following the cooling of the gel the structure comprises substantially a two-phase system wherein a polypropylene continuous phase permeates the diluent phase. The diluent phase is then removed by extraction with a low-boiling solvent which is inert to the polypropylene. Any low-boiling liquid which will dissolve the hydrocarbon diluent without dissolving the polymer can be used. Such solvents include low-boiling hydrocarbons such as pentane or hexane, alcohols, ethers, or ketones. The extraction solvent is then removed by a simple drying operation as in an oven.

In order to increase the tensile strength of the porous structures prepared according to this invention, they can be reinforced with a fibrous material. This is particularly helpful in the case of low molecular weight polymers, though it is not so limited. The fibrous material can be staple fibers or a fabric, either woven or nonwoven. The reinforcing fibers become embedded in the continuous polymer phase and individual fibers are distributed among several spherulites to effect reinforcing without any significant deleterious effect on the porosity of the structure.

As stated above, the porosity of the structures prepared according to this invention is related to the rate at which the gel is cooled. Slower cooling rates promote higher porosity. Thus, by selection of cooling rate it is possible to some extent to tailor structures of a predetermined porosity to fill a particular need, Structures can be prepared which are permeable to gases, but relatively impermeable to liquids, or which are highly permeable only to liquids of certain specified viscosity or molecular weight characteristics. They will, of course, be substantially impermeable to all solid matter.

The high molecular weight, fine particle polymer useful in the process of this invention can be prepared by any process which results in a crystalline polymer having the desired particle size. A particularly desirable method of forming small particles, as stated above, is by polymerizing the olefin or olefins in the presence of a colloidal dispersion of a trivalent titanium containing catalyst. Particularly effective catalysts for this purpose are combinations of alkylaluminum compounds and titanium compounds. When preparing the colloidal dispersions of crystalline olefin polymer, it is necessary first to prepare a colloidal trivalent titanium containing catalyst and then use this catalyst in combination with an aluminum alkyl compound to polymerize the olefin and obtain the colloidal dispersion. Any titanium trichloride can be used for the preparation of the colloidal catalyst provided that it contains, if any, only a minor amount of the beta form of the titanium trichloride. A particularly active titanium trichloride-containing catalyst is obtained by reducing titanium tetrachloride at low temperature with an aluminum alkyl such as an alkylaluminum sesquichloride and then heat treating the precipitate so obtained. A colloidal dispersion of the trivalent titanium-containing catalyst is then prepared by suspending it in any convenient inert hydrocarbon diluent, as for example, n-heptane, kerosene, etc. To this suspension is then add a dialkylaluminum halide such as diethylaluminum chloride or diisobutylaluminum chloride, in a ratio of from about 0.1 to about 4.0 aluminum per titanium. Other catalyst components can be used in conjunction with the titanium and aluminum components such as Lewis bases, as for example, anisole. There is then added from 3 to 40 moles per mole of titanium of a straight chain α-olefin containing at least 6 carbon atoms. Exemplary of the α-olefins that can be used for this purpose are: n-hexane-1, N-octene-1, decene-1, undecene-1, dodecene-1, and hexadecene-1. The polymerization of this long chain αolefin is generally carried out at moderate temperatures, as for example, from about 30° C. to about 70° C. There is obtained by this process a colloidal suspension the trivalent titanium-containing catalyst. This colloidal suspension can be used at once or stored until desired.

The polymerization is carried out by adding to a suitable liquid organic diluent, as for example, a saturated aliphatic, cycloaliphatic, or aromatic hydrocarbon, an aluminum alkyl activator such as, e.g., diethylaluminum chloride or ethylaluminum chloride alkoxide, in an amount of from about 5 to 10 millimoles per liter of diluent. Exemplary of the diluents that can be used are: hexane, heptane, octane, decane, cyclohexane, benzene, toluene, xylene, and mixtures of such hydrocarbons, as for example, high and low boiling kerosene and other such petroleum fractions chlorinated aromatic hydrocarbons, highly hindered aliphatic ethers, sulfides etc., such as di-t-butyl ether, aromatic ethers such as diphenyl ether and other inert liquid organic diluents and liquid propylene itself. The colloidal dispersion of trivalent titanium catalyst is then added and the olefin or mixture of olefins is introduced at a very slow rate so as to gradually increase the pressure to 75 p.s.i.g. or higher, which pressure is maintained until the polymerization is complete. Hydrogen can be added if desired to produce a lower molecular weight polymer. The polymerization is generally carried out at a temperature of from about 30° C. to about 80° C. The length of time the polymerization is carried out will be dependent upon the solids content desired or until the viscosity of the reaction mixture becomes too great for easy agitation. The polymerization is stopped by adding a small amount, as for example 2 volume percent based on the original volume of diluent, of an alkanol such as n-butanol. The catalyst residues are removed by any of the usual means utilized in the purification of polyolefins, such as for example, an acid, water or basic wash, treatment with an ion exchange resin or any other convenient means.

Since most of the desirable organic liquids which can be used as gel-forming solvents in the process of the invention can also be employed as polymerization diluents, it is possible and frequently desirable to polymerize the polymer slurry directly to the desired solids content during the polymerization step and to use this product in the invention. However, the product of the polymerization described above can be dried of diluent by simple evaporation and readily redispersed in a different diluent if circumstances favor using different media for the two operations.

In the examples which follow, parts and percentages are by weight in all cases unless otherwise specified. Example 1 is intended only to illustrate the above-described method of preparing the small particles of polymer which are employed in the practice of the invention.

EXAMPLE 1

A nitrogen filled reaction vessel was charged with 77.5 millimoles of isobutyl aluminum sesquichloride as a 25 percent solution in a purified kerosene fraction (boiling range of 165°–200° C.). With the temperature at 0° C., 40 millimoles of titanium tetrachloride was added in a single injection. The reaction mixture was stirred for 5 hours at 0° C. and then was allowed to warm to room temperature during 16 hours. The temperature was then raised during a period of 1.5 hours to 130° C. and was held there for 30 hours. The solid titanium trichloride-containing catalyst was separated and washed three times with 50 ml. portions of n-heptane.

A second nitrogen filled reaction vessel was charged with 100 ml. of a purified kerosene (boiling range of 188°–265° C.), 0.5 millimole of diethylaluminum chloride, 2.5 millimoles of the above-prepared catalyst, and, with the temperature at 50° C., 36 millimoles of octene-1 was added The reaction was held at 50° C. for 1 hour and analysis showed that 92 percent of the octene had reacted.

Another nitrogen filled reactor was charged with 900 ml. of purified kerosene (boiling range 188°–265° C.), 10 millimoles of diethylaluminum chloride and 120 cc. of oxygen. After 15 minutes at 50° C., the reactor was sparged with nitrogen to remove any unreacted oxygen and the above-prepared colloidal catalyst was added. Propylene was then passed in and the pressure was slowly increased to 50 p.s.i.g. and maintained at a that pressure during the polymerization. After 6 hours, the polymerization was shortstopped by adding 20 ml. of butanol and the reaction mixture was stirred at 50° C. for 16 hours. It was then transferred to a vessel containing 300 cc. of water-wet, mixed-bed ion exchange resin and stirred under nitrogen for 5 hours at room temperature, after which it was poured through a cloth paint filter to remove the resin. The dispersion so obtained contained 22.9 percent solids and the polypropylene, which contained 7.2 percent decahydronaphthalene soluble polymer, had an intrinisc viscosity of 10.5. The primary particles had an average size of of about 0.3 micron and there was no significant amount of clusters above about 2 microns in size.

EXAMPLE 2

Using the procedure exemplified in example 1, a kerosene dispersion was prepared having 33.5 percent by weight of small particle polypropylene of IV 12.8 and an average primary particle size of about 0.3 micron.

A portion of the kerosene dispersion thus obtained was poured into a mold to form a film of the dispersion 20 mil thick. This was heated to about 163° C. in a forced draft oven for 30 minutes to give a clear solution which appeared homogeneous to the eye. The mold and the solution were removed to an insulated container wherein the solution was cooled to room temperature at a rate of about 4° C./minute. The completely cooled solution resembled a weak, pliable gel. This gel was rinsed in butanol several times until all the kerosene was removed, and then in methanol. Thereafter, the alcohol was removed by drying at room temperature.

The extracted sheet had a rough, porous, totally opaque, surface having sufficient body to support itself readily. The sheet had a density of 0.31 g./cc. The porosity of this sheet was measured on a paper densometer which measures porosity by air flow under slight pressure. Porosity was 23 sec./100 cc./sq. in. Tensile properties, measured on the Instron Tensile Tester were as follows:
Tensile Strength: 117 p.s.i.
Elongation: 10 percent
Modulus: 4,000 p.s.i.

Three additional samples of the dispersion were cast into 20 mil sheets and fused at 163° C. for 30 minutes. These were cooled at various rates to illustrate the effect of cooling on the characteristics of the sheet. The cooling rates employed and the results obtained are recorded in the following table:

| Cooling rate | Density | Porosity [1] | Tensile | Elong. | Modulus |
| --- | --- | --- | --- | --- | --- |
| Quenched (~125° C./min.) | 0.88 | >1,800 | 1,420 | 10 | 51,000 |
| On bench top (~40° C./min.) | 0.45 | 973 | 450 | 43 | 14,000 |
| ~12° C./min. | 0.32 | 73 | 188 | 22 | 4,500 |

[1] Sec./100 cc./sq. in. as described above.

The inverse relationship between porosity and other physical properties and cooling rate is easily seen from the above data. The specimen which was quenched has low porosity and could not be employed in any application where high porosity is a requirement. The specimen which was cooled on the bench top at 40° C./minute is useful as a porous fabric. The more slowly cooled specimens can be used as filter cloths, or in applications where nonwoven fabrics are usually employed.

EXAMPLE 3

A 25 percent dispersion of propylene homopolymer having IV of ≈9 and average primary particle size of about 0.3 micron was prepared substantially as in example 1 using kerosene as reaction diluent. A film of this material was cast on a steel panel, gelled by heating to 166° C. for 1 minute, then allowed to cool to room temperature over a period of ≈3 minutes in air. The resulting gel was soft and weak. This was extracted with xylene and acetone until all traces of the hydrocarbon had been removed, then air-dried. A soft, white, opaque, low stiffness polypropylene network structure remained after extraction. This sheet had approximately the appearance of rough, white paper.

EXAMPLE 4

A dispersion of 27 percent by weight polypropylene (IV 11.7, 0.3$\mu$ average particle size) in kerosene was prepared.

A nonwoven polyester mat was dipped in a 1 percent by weight xylene solution of maleic anhydride modified amorphous polypropylene (≈0.5 percent maleic anhydride by weight) blown with air and dried at 60° C. This mat was impregnated with the above polypropylene dispersion and the impregnated mat was heated to 160° C. to gel the polymer which was then cooled in air to room temperature at about 40° per minute. The cooled mat was extracted with heptane and ethanol, then dried of extraction solvents in a vacuum oven.

The dried mat contained 35 percent polyester fabric and 65 percent polypropylene. It was tough, strong, flexible and highly porous. Its porosity was about 900, measured on the paper densometer, and its tensile strength was in excess of 2,000 p.s.i.

EXAMPLE 5

Example 3 was repeated using a 0.3$\mu$ particle size polymer having an intrinsic viscosity of about 3.6. The gel before extraction was extremely soft and weak. The extracted structure from this gel was similar in appearance to that of example 3, but was not as strong.

EXAMPLE 6

A dispersion of a copolymer of about 91 percent ethylene and 9 percent propylene (IV 12.3, $\mu$0.3$\mu$ average particle size) in kerosene was used in this example. A film of the dispersion, about 0.12 inch thick was fused at about 140° C. and cooled in air at about 40° C. per minute. The cooled material was washed twice with n-butanol, then with methanol, then air dried.

The resulting sheet was milky white, tough, and extensible. Its density was about 0.86 gram/cc. and it has porosity of about 30 sec./100 cc./sq.in.

EXAMPLE 7

A 25.4 percent solids dispersion of a copolymer of about 98 percent propylene and 2 percent ethylene (IV ≈11, ≈0.4$\mu$ average particle size) in a kerosene-type hydrocarbon was fused into a 1/16-inch film for 3 minutes at 190° C., then cooled in air at about 60° C. per minute. The cooled material was washed three times with isopropanol, once with methanol, and air dried. The resulting white, porous sheet had a density of about 0.5 gram/cc. Its porosity was about 35 sec./100 cc./sq.in.

EXAMPLE 8

Dispersions of small particle polypropylene (≈0.3$\mu$, IV 10, 19.6 percent in kerosene) and conventional commercial polypropylene flake (30 to 200$\mu$, IV 10.4, 19.6 percent in kerosene) were compared for their efficacy in preparing porous sheets according to this invention. Identical volumes of each dispersion were formed into 0.12 inch films and fused 3 minutes at 190° C., then cooled in air at about 45° C. per minute. The fused structures were washed with isopropanol and air-dried. Both sheets were white and porous, but the sheet prepared from the small particles was smooth surfaced and of relatively uniform thickness at all points on its surface. The sheet prepared from flake was rough and irregular in surface appearance and had considerable point-to-point variation in thickness. The small particle sheet was stronger and on microscopic examination, exhibited more and uniformly sized pores or voids.

What I claim and desire to protect by Letters Patent is:

1. A method of forming a porous structure which comprises forming a slurry of small particles of crystalline polypropylene having an intrinsic viscosity of at least about 9 in a high boiling organic liquid which has solvent power for the polypropylene at an elevated temperature but below its boiling point and below the melting point of the polymer polypropylene having an average primary particle size of 0.02 to $0.5\mu$ with at least 75 percent of said primary particles being within the range of 0.2 to $0.4\mu$, heating the slurry to a temperature at which the polymer dissolves, cooling the resultant gel to room temperature at a rate less than about 100° C., per minute, and thereafter removing the organic diluent.

2. Process according to claim 1 wherein the high boiling organic liquid is a hydrocarbon which is a liquid at above about 100° C.

3. Process according to claim 1 where the organic diluent is removed by extraction with an organic solvent which has essentially no solvent power for crystalline polypropylene at the extraction temperatures.

4. Process according to claim 1 wherein the slurry is formed into the desired shape prior to heating to effect dissolution thereof.